United States Patent [19]

Maehara

[11] Patent Number: 5,316,378
[45] Date of Patent: May 31, 1994

[54] BRAKE FLUID PRESSURE CONTROL APPARATUS

[75] Inventor: Toshifumi Maehara, Saitama, Japan

[73] Assignee: Akebono Brake Industry Co., Ltd., Tokyo, Japan

[21] Appl. No.: 824,033

[22] Filed: Jan. 22, 1992

[30] Foreign Application Priority Data

Jan. 22, 1991 [JP] Japan .................. 3-006014
Jan. 14, 1992 [JP] Japan .................. 4-005221

[51] Int. Cl.⁵ .............................. B60T 15/46
[52] U.S. Cl. .................. 303/84.2; 188/353; 477/196
[58] Field of Search .......... 303/84.1, 84.2, 89, 303/113 TR, 116 SP, 119 SV; 188/353, 265; 192/1.32, 1.33, 1.35; 137/598, 599.1; 251/129.21

[56] References Cited

U.S. PATENT DOCUMENTS

| | | | |
|---|---|---|---|
| 2,502,118 | 3/1950 | Aston et al. | 192/1.35 X |
| 3,152,426 | 10/1964 | Milster | 188/353 X |
| 4,640,391 | 2/1987 | Maehara et al. | 188/353 |
| 4,865,175 | 9/1989 | Hirako et al. | 192/1.33 X |
| 4,915,131 | 4/1990 | Cha | 192/1.33 X |

Primary Examiner—Robert J. Oberleitner
Assistant Examiner—Lee W. Young
Attorney, Agent, or Firm—Knobbe, Martens, Olson & Bear

[57] ABSTRACT

A brake fluid pressure control apparatus is disclosed which is capable of providing a good brake feel at the initial stage of pressure reapplication. The brake fluid pressure control apparatus comprises a pressure receiving device 25 and a valve mechanism 19 for closing a fluid passage 10 from a master cylinder 7 to wheel cylinders 8. The wheel cylinder fluid pressure is held by closing the fluid passage when the vehicle is brought to a halt with the brake applied, so that the vehicle can be held stationary if the driver takes his food off the brake pedal. When the pressure is to be applied again from the master cylinder 7, the pressure applied during the initial period of this reapplication of the master cylinder pressure is received by the pressure receiving device.

6 Claims, 7 Drawing Sheets

BRAKE FLUID PRESSURE CONTROL APPARATUS

BACKGROUND OF THE INVENTION

1. Field of the Invention

The present invention relates to a brake fluid pressure control apparatus for motor vehicles and, more particularly, to a brake fluid pressure control apparatus capable of keeping the motor vehicle stationary with a driver's foot off a brake pedal.

2. Description of the Prior Art

As a prior-art technique of this type, a brake pressure holding device shown in FIG. 7 has been known. In this drawing, when a specific period of time has passed, with the brake pedal depressed by the driver, in the state that the halt of the vehicle is detected by the main control device not illustrated, a solenoid valve 36 inserted in a main a fluid passage 10 connected between a master cylinder 7 and wheel cylinders 8 is closed to hold the fluid pressure in the wheel cylinders 8, thus holding the vehicle in the stationary state even if the driver takes his foot from the brake pedal.

In the above-described prior-art device, it is necessary to press the brake pedal again to apply the fluid pressure to the wheel cylinders 8 in case the fluid pressure in the wheel cylinders 8 has dropped while the brakes are applied.

The master cylinder 7 has a master piston 34. Around this master piston 34 is fitted a master cup 33 produced of an elastic material such as a synthetic rubber, thereby preventing fluid leakage caused by the fluid pressure from the wheel cylinder 8 side.

Provided in the inside peripheral surface of the master cylinder 7, close to the master cup 33, is a relief port 30 for discharging the fluid pressure out from the chamber of the master cylinder 7.

On ordinary brake operation, the brake pedal is depressed to gradually increase the master cylinder fluid pressure, and accordingly increasing the wheel cylinder fluid pressure. The driver, therefore, can obtain a satisfactory brake feel as he further depresses the brake pedal for a predetermined stroke.

However, when applying the fluid pressure again to the wheel cylinders 8 with the fluid held in the wheel cylinders 8, the master piston 34 starts moving toward pressure application. As the master cup 33 has passed the relief port 30, the fluid pressure from the wheel cylinder 8 is directly applied to the master cup 33. Therefore, brake pedal reaction force suddenly increases and a brake feel differs a great deal from that in ordinary brake operation, resulting in a very heavy brake pedal.

SUMMARY OF THE INVENTION

The present invention has been accomplished in an attempt to solve the problems mentioned above and has as its object the provision of a brake fluid pressure control apparatus which gives a vehicle driver an improved brake pedal operation feeling in the initial stage of reapplication of brake pressure.

According to the present invention, a brake fluid pressure control apparatus has a valve mechanism. This valve mechanism is inserted in a main fluid passage which connects a master cylinder to wheel cylinders. The valve mechanism has a main control valve for closing the main fluid passage so as to hold the wheel cylinder fluid pressure when a motor vehicle is halted and held stationary with brakes applied. Therefore the vehicle can be kept in the stationary state even if the driver takes his foot off the brake pedal. The valve mechanism has a check valve mounted in the main fluid passage. The check valve permits the supply of the fluid pressure from the master cylinder to the wheel cylinders when said main fluid passage is closed by the main control valve.

The present invention has a brake fluid receiving device for receiving and consuming initial fluid pressure from the master cylinder when the master cylinder operates to apply the fluid pressure again after the main control closes the main fluid passage upon detecting the halt of the motor vehicle.

The check valve opens to apply the fluid pressure to the wheel cylinder through the check valve after receiving and consuming the initial fluid pressure from the master cylinder by the brake fluid receiving device.

In the present invention, more preferably, the brake fluid receiving device has a stepped cylinder. This cylinder has a inlet port connected to the master cylinder and an outlet port connected to the wheel cylinders.

The brake fluid receiving device has a stepped piston housed in the stepped cylinder. The stepped cylinder has a large diameter end receiving a fluid pressure of the master cylinder and a small diameter end receiving a fluid pressure of wheel cylinders. The stepped cylinder is pressed toward the outlet port side by an elastic member.

The stepped piston receives and consumes initial fluid pressure of the master cylinder by movement of the stepped piston by utilizing a pressure difference between a pressure supplied from said master cylinder to the large diameter end of the stepped piston and a pressure acting from said wheel cylinders to the small diameter end of the stepped piston, when the fluid pressure is reapplied from the master cylinder to said wheel cylinder after said fluid passage is closed by said main control valve with the motor vehicle brought to a halt.

According to the above described means, when the halt of the motor vehicle is sensed and the fluid passage is closed by the main control valve, the stepped piston is moved toward the inlet chamber in the inlet port by the fluid pressure from the wheel cylinders, because the pressure of the inlet chamber is atmospheric pressure.

Then, when the master cylinder operates to apply the fluid pressure again to the wheel cylinders, the initial pressure in the master cylinder is consumed as a force used to move the piston toward the outlet chamber in the outlet port.

Therefore, the reactive force of the brake pedal will not suddenly increase, giving the driver a good brake pedal operation feeling.

As the pressure application from the master cylinder is further continued until the fluid pressure between the valve mechanism and the mater cylinder exceeds the pressure of the wheel cylinder, the check valve of the valve mechanism is opened to supply an additional amount of fluid pressure to the wheel cylinders.

That is, in the case of reapplication of the fluid pressure, the master cylinder fluid pressure is not immediately exerted to the wheel cylinders, but is once consumed by the movement of the stepped piston. Therefore, the brake will be applied again after the brake pedal is depressed for a predetermined stroke, thus giving the driver the same brake feel as in ordinary braking.

Further, a brake fluid pressure control apparatus of the present invention includes another embodiment of the brake fluid receiving device.

That is, the brake fluid receiving device has a cylinder. This cylinder has a inlet port connected to the master cylinder and an outlet port connected to the wheel cylinders. The cylinder has a valve chamber in the inlet port side.

The brake fluid receiving device has a reservoir passage connected to the valve chamber and a reservoir chamber communicating with the valve chamber through the reservoir passage. This reservoir chamber receives the initial fluid pressure when the fluid pressure is reapplied from the master cylinder to said wheel cylinder after said fluid passage is closed by said main control valve with the motor vehicle brought to a halt.

The brake fluid receiving device has a select valve. This select valve controls the opening and closing of said reservoir passage by utilizing a pressure difference between said wheel cylinders and said master cylinder.

According to this embodiment, When the fluid pressure of the master cylinder goes back to the atomospheric pressure after the main fluid passage is closed by the main control valve upon the detection of the halt of the motor vehicle, the select valve opens reservoir passage by receiving of the fluid pressure of the wheel cylinder to connect the reservoir chamber to the master cylinder.

When the master cylinder operates to apply the fluid pressure again to the wheel cylinders, the initial fluid pressure of this master cylinder passes through the reservoir passage, being received into the reservoir chamber. Accordingly, the brake pedal reaction will not suddenly increase, giving a good brake feel.

As the application of the fluid pressure from the master cylinder is further continued until the pressure in the reservoir chamber rises over the pressure of the wheel cylinder, the check valve 14 in the main fluid passage is then opened to supply an additional fluid pressure to the wheel cylinders.

The foregoing object and other objects, as well as the actual construction and operation of the control apparatus according to the present invention, will become more apparent and understandable from the following detailed description thereof, when read in connection with the accompanying drawings.

DESCRIPTION OF PREFERRED EMBODIMENTS

First Embodiment

An embodiment 1 of a brake fluid pressure control apparatus according to the present invention will be explained by referring to FIGS. 1 to 3.

Figure 1:
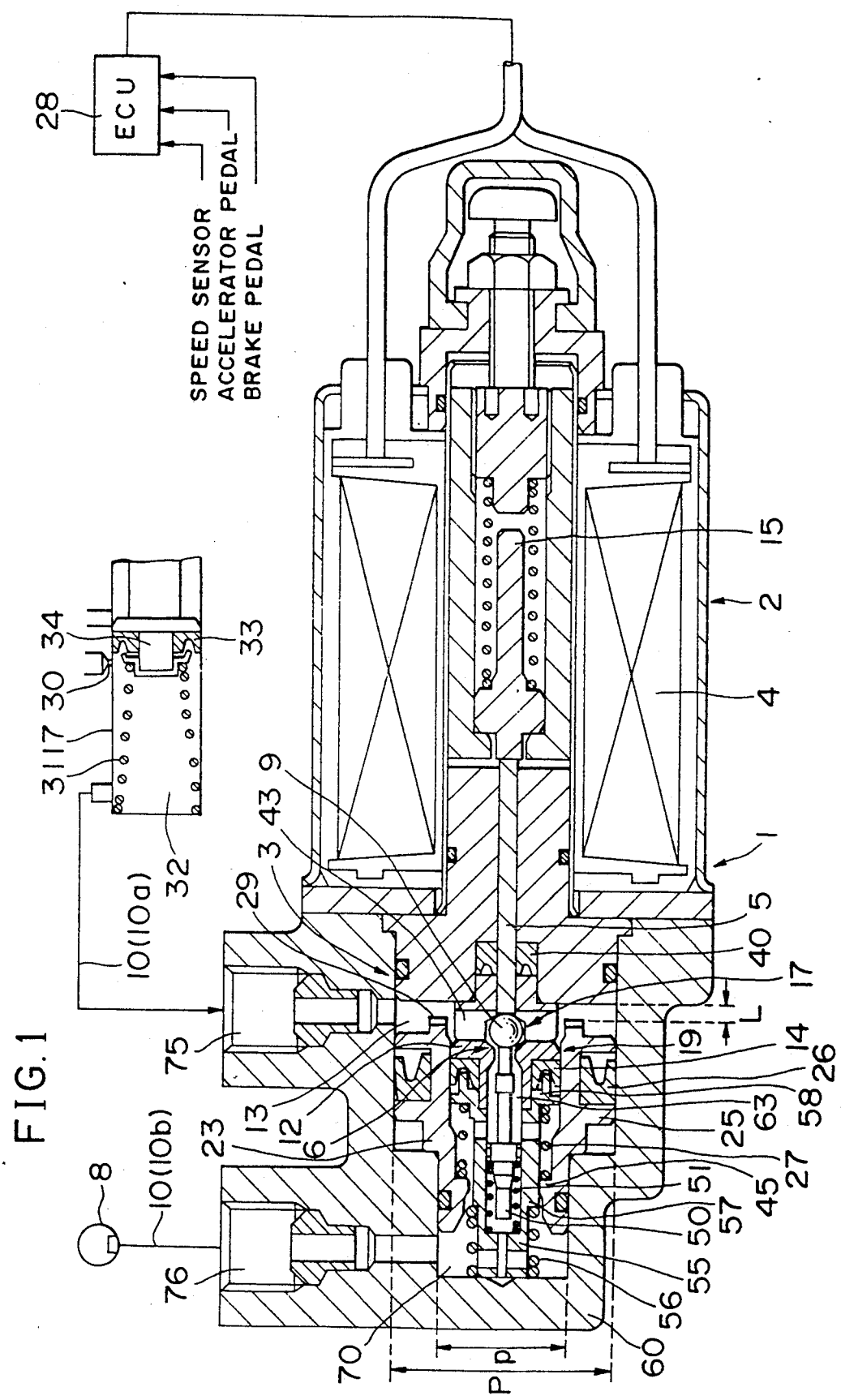
FIG. 1 is a sectional view showing an embodiment 1 of a brake fluid pressure control apparatus according to the present invention under a normal condition.

In FIG. 1, the brake fluid pressure control apparatus 1 has a solenoid section 2 and a valve section 3. A plunger 15 operating on the power supplied to the solenoid 4 is mounted in the center of this solenoid section 2. A rod 5 is connected to the end of this plunger 15 on the valve section side. The forward end of the rod 5 is in contact with a ball valve 9. A rod seal 40 is provided around the rod 5 to prevent fluid leakage from the valve section side to the solenoid section side.

The valve section 3 has a stepped cylinder defined in a housing 60. One end of this stepped cylinder has an inlet port 75 through which the fluid pressure is supplied from the master cylinder 7 through a fluid passage 10a, while the other end of the stepped cylinder has an outlet port 76 for supplying the fluid pressure to the wheel cylinders 8 through the fluid passage 10b.

This stepped cylinder has an inlet chamber 13 on the inlet port side and an outlet chamber 70 on the outlet port side. The diameter of the inlet chamber 13 is larger than that of the outlet chamber 70.

A cylindrical stepped piston 25 used as the pressure receiving device with its outside diameter formed so as to conform to the configuration of the stepped cylinder is slidable in the stepped cylinder of the housing 60. That is, the stepped piston 25 has a large diameter on one side of a step 23 formed on the outside surface of the stepped piston 25 and a small diameter on the other side. In a normal state, the pressure control piston 25 is fitted in the stepped cylinder with the step 23 of the piston 25 and the stepped section of the stepped cylinder are in contact with each other.

A first cup 26 for preventing fluid leakage is mounted on the outside periphery of the large-diameter section of the stepped piston 25. On the right-hand end of the stepped piston 25 has a groove 29.

Inside of the stepped piston 25 in the stepped cylinder, a valve mechanism 19 is provided, coaxially with the stepped piston 25, to control the fluid pressure supplied from the master cylinder 7 side to the wheel cylinder 8 side. That is, the valve mechanism 19 is housed in the stepped piston 25.

This valve mechanism 19 includes a main control valve 17 for closing the fluid passage 10 and a booster cup 14 as a check valve.

The main control valve 17 is composed of a cylindrical valve seat 12 and a ball valve 9 for closing an opening-closing port 6 of the valve seat 12. Inside of this valve seat 12 is formed a fluid pressure passage 63.

On the right-hand end section of the valve seat 12 is installed a ball guide 43 for positioning the ball valve 9. In this ball guide 43 is formed a concave of nearly the same diameter as the ball valve 9, which is nestled in this concave.

The inside of the stepped cylinder and on the outer periphery side of the ball guide 43 is formed as a inlet chamber 13 communicating with the inlet port 75. This inlet chamber 13 communicates with the opening-closing port 6. Therefore, when no power is supplied to the solenoid 4, the brake fluid is supplied through the following passage as the master cylinder 7→the fluid passage 10a→the inlet port 75→the inlet chamber 13→the opening-closing port 6→the passage 63→the outlet port 76→the fluid passage 10b→the wheel cylinders 8.

The booster cup 14 as a check valve is designed to allow the flow of the pressurized fluid only in the direction from the inlet chamber 13 to the fluid passage 10b.

The left side of the booster cup 14 in the drawing is in contact with the right end of the cup holder 55. And a spring 56 is fitted between a stepped section 57 on the left end side of the cup holder 55 and the housing 60.

Between a stepped section 58 on the right-hand end side of the cup holder 55 and a stepped section 45 on the inside of the stepped piston 25 is fitted a set spring 27 which is an elastic member.

The booster cup 14 and the valve seat 12 which is in contact with the right-hand side of the booster cup 14 are pressed rightward (toward the inlet chamber 13) by the spring 56 and the set spring 27. The pressure control piston 25 is pressed leftward in the drawing (toward the outlet chamber 70) by the set spring 27.

The large diameter side of the piston 25 serves as a fluid receiving surface of a diameter P which receives the fluid pressure from the master cylinder 7. The fluid pressure exerted on this fluid receiving surface acts to press the stepped piston 25, together with the set spring 27, toward the outlet chamber 70.

On the other hand, the small diameter side of the stepped piston 25 constitutes a fluid pressure receiving surface of a diameter p which receives the fluid pressure from the wheel cylinder 8. The fluid pressure working on this fluid pressure receiving surface when the fluid pressure is held in the wheel cylinders 8 acts against the force of the set spring 27, moving the stepped piston 25 toward the inlet chamber 13.

Installed in the cup holder 55 is a valve rod 50. This valve rod 50 is being pressed rightward in the drawing by means of a spring 51, and pushing the ball valve 9 in contact with one end of the valve rod 50, toward the solenoid section 2 side. Therefore, the opening-closing port 6 is opened normally.

Next, the operation of the present embodiment of brake fluid pressure control apparatus will be explained.

FIG. 1 shows the normal state of the present embodiment; FIG. 2 shows the wheel cylinder 8 in which the fluid pressure is held; and FIG. 3 is a drawing showing the wheel cylinder 8 in which the fluid pressure thus held is boosted.

Figure 2:
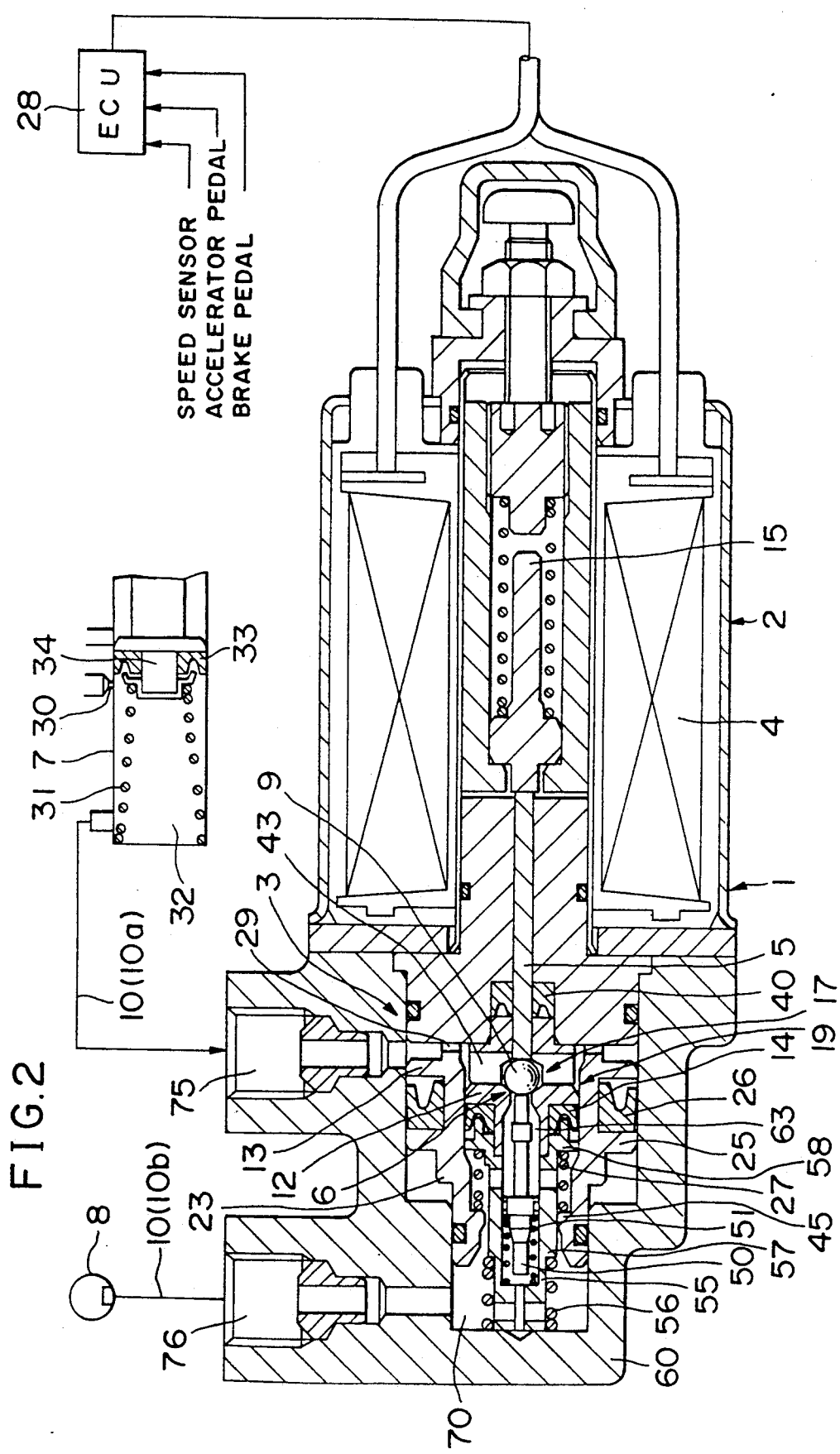
FIG. 2 is a sectional view showing the same embodiment of the brake fluid pressure control apparatus with the brake fluid pressure held in a wheel cylinder 8.
Figure 3:
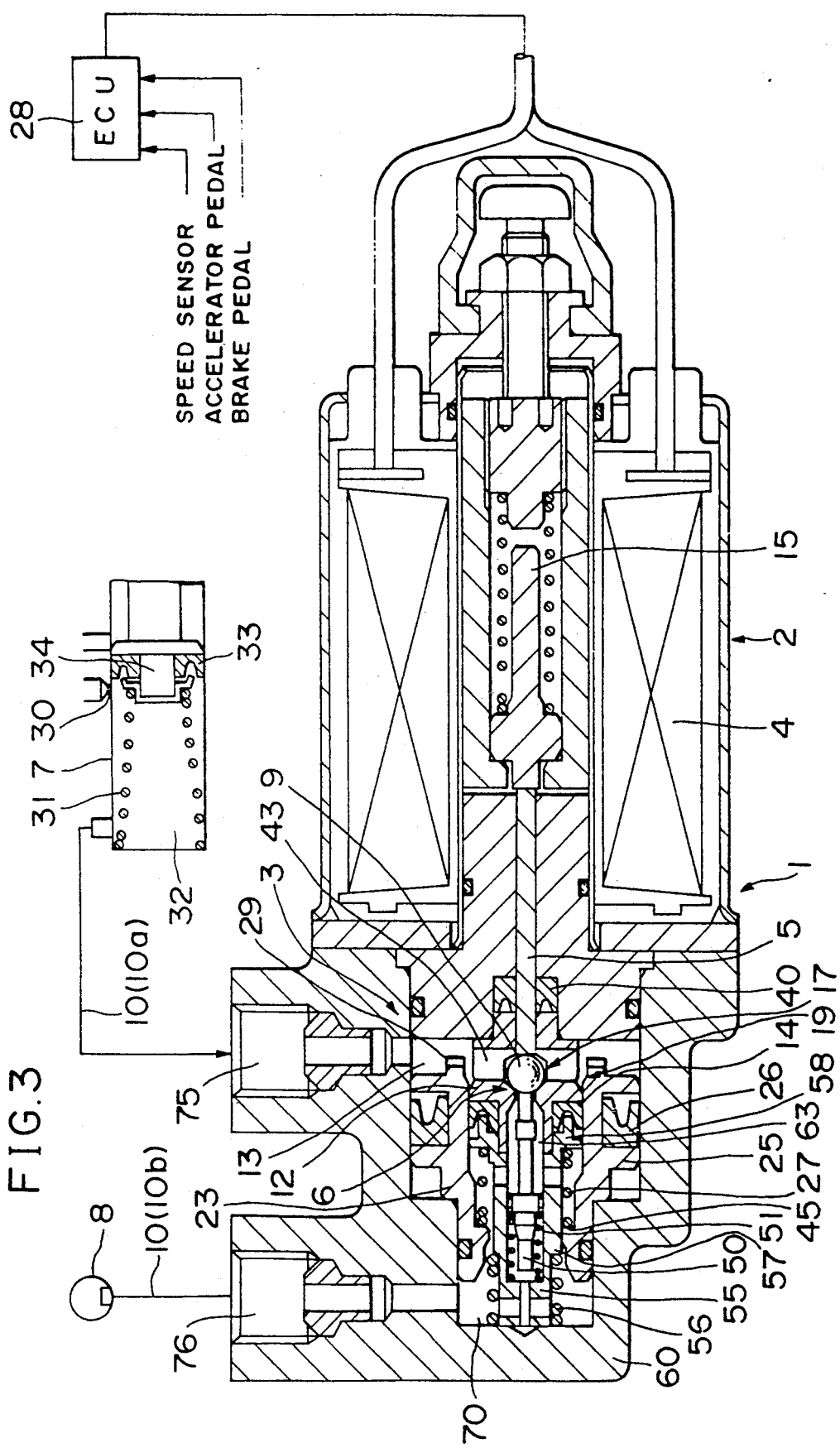
FIG. 3 is a sectional view showing the same embodiment of the brake fluid pressure control apparatus with the fluid pressure increased.

First, in FIG. 1, when the main control device 28, receiving signals from the brake pedal, the accelerator pedal and a speed sensor, detects the halt of the motor vehicle caused by the depression of the brake pedal, and further detects the lapse of a predetermined period of time (e.g. 1 to a few seconds) in this state of halt, the electric power is supplied to the solenoid 4, thus moving the plunger 15 leftward in the drawing as shown in FIG. 2.

With this movement of the plunger 15, the rod 5 also moves leftward against the spring 51, and the ball valve 9 which is in contact with the forward end of the rod 5 comes into contact with the valve seat 12, thereby closing the opening-closing port 6. Thus the fluid passage 10 is closed to hold the fluid pressure in the wheel cylinder 8.

Therefore, the fluid pressure is held within the wheel cylinder 8, if the driver releases the brake pedal, the motor vehicle being kept in the state of halt with the braking force applied.

Here, the pressure fluid from the wheel cylinder 8 acts on the fluid pressure surface of the diameter p of the stepped piston 25, which in turn slides against the force of the set spring 27 until the groove 29 comes in contact with the left end of the inlet chamber 13. That is, the pressure control piston 25 moves rightward for the length L shown in FIG. 1.

Next, when the reapplication of the fluid pressure from the master cylinder 7 is needed because of a lack of the fluid pressure in the wheel cylinder 8, the master piston 34 in the master cylinder 7 starts moving against the force of the master spring 31 toward compressing the fluid in the master fluid pressure chamber 32.

At the initial stage of movement of the master piston 34 the master cup 33 fitted on the master piston 34 passes a relief port 30. At this time, the fluid pressure in the initial stage of movement of the master piston 34 passes, as shown in FIG. 3, along the master cylinder 7→the fluid passage 10a→the inlet port 75→the inlet chamber 13, and acts on the fluid pressure receiving surface of the stepped piston 25, being consumed by a force for moving the pressure control piston 25 toward the wheel cylinder 8. Therefore, at the initial stage of movement of the master piston 34, the pressure in the master cylinder gradually increases, providing a good brake feel.

When pressure application by the master piston 34 is further continued, the pressure control piston 25 moves leftward (to a position in the normal state) until the stepped section 23 of the pressure control piston 25 comes into contact with the stepped section of the stepped cylinder of the housing 60. At the same time, the pressure fluid in the fluid passage 10a which is supplied from the master cylinder 7, is supplied from the inlet chamber 13 to the fluid passage 10b on the wheel cylinder 8 side via the booster cup 14 to apply the pressure into the wheel cylinder 8.

According to the present embodiment, the valve mechanism 19 is installed in the pressure control piston 25, but the stepped piston 25 and the valve mechanism 19 may be arranged parallelly, and further may be installed separately with independent bypass lines formed on the fluid passage 10. Further, only the booster cup 14 of the valve mechanism 19 may be provided in the independent bypass lines thus separately installed on the fluid passage 10.

Further, according to the present embodiment as described above, there is provided the stepped piston 25 for receiving and consuming the fluid pressure during the initial movement of the master piston 34 when the fluid pressure is reapplied to the wheel cylinders 8. In this cylindrical stepped piston 25 is installed the valve mechanism 19 for controlling the fluid pressure supplied from the master cylinder 7 to the wheel cylinders 8.

It is, therefore, possible to form the pressure receiving device and the valve mechanism into one body, and accordingly there is no necessity to provide separately a reservoir chamber for receiving the fluid pressure and a reservoir passage which connect the reservoir chamber to the inlet chamber, thereby enabling the provision of a compact brake fluid pressure control apparatus which is able to control the initial pressure at the time of pressure reapplication.

In the brake fluid pressure control apparatus of the above-described construction which is capable of holding the brake fluid pressure in the wheel cylinders when the motor vehicle is at a stop, since the pressure to be reapplied is once received by the pressure receiving device at the initial stage of pressure application, the master cylinder pressure gradually increases, giving the driver a good brake feel.

Second Embodiment

Figure 4:
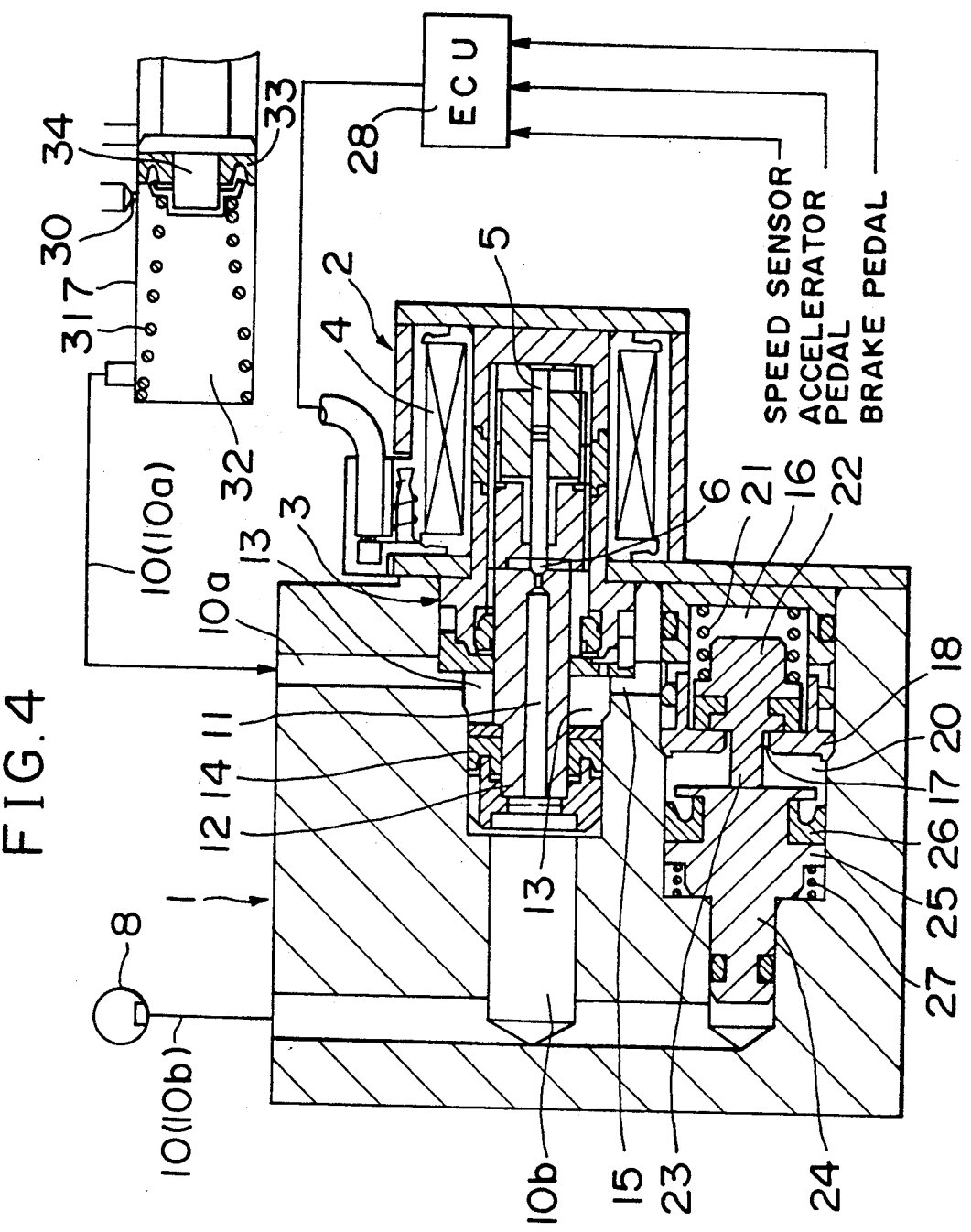
FIG. 4 is a sectional view showing a second embodiment of the brake fluid pressure control apparatus according to the present invention.

FIG. 4 shows an embodiment 2 of the brake fluid pressure control apparatus according to the present invention.

In this drawing, the brake fluid pressure control apparatus 1 comprises the solenoid section 2 and the valve section 3. At the center of the solenoid section 2 is the plunger 5 which operates on the electric power supplied to the solenoid 4.

The valve section 3 includes a cylinder having an inlet port connected to the master cylinder and an outlet port connected to the wheel cylinder through the main fluid passage 10. The forward end of this plunger 5 is positioned oppositely to an opening-closing port 6 of the valve section 3. This opening-closing port 6 is closed and opened by the plunger 5 which moves back and forth, thus closing and opening the main fluid passage 10 from the master cylinder 7 to the wheel cylinder 8.

The valve section 3 has a valve block 12 in the cylinder. The valve block 12 is provided with a fluid passage 11 as the main fluid passage 10 inside. The base end of this valve block 12 forms the opening-closing port 6 while the forward end communicates with the main fluid passage 10 extending to the wheel cylinder 8. In the peripheral surface of the valve block 12 is formed the inlet chamber 13 on the inlet port side. The inlet chamber 13 is communicating with the main fluid passage 10a connected to the master cylinder 7. The axial base end of this inlet chamber 13 communicates with the opening-closing port 6. Therefore, when no electric current is being supplied to the solenoid 4, the brake fluid is supplied through the passage consisting of the master cylinder 7→the main fluid passage 10a→the inlet port→the inlet chamber 13→the opening-closing port 6→the fluid passage 11 in the block→the outlet port→the main fluid passage 10b→the wheel cylinder 8.

On the axially forward end side of the inlet chamber 13, the booster cup 14 as the check valve is fitted on the peripheral surface of the forward end of the valve block 12, which permits the flow of the pressure fluid only in the direction from the inlet chamber 13 to the main fluid passage 10b.

The inlet chamber 13 communicates with the select valve chamber 16 through a reservoir passage 15. The select valve chamber 16 communicates with the reservoir chamber 20 via a valve seat 18 having a hole 17 open at center. In the select valve chamber 16 is installed a select valve body 22 which, forced in the normal state by the valve spring 21 toward the reservoir chamber 20, closes the hole 17 of the valve seat 18. At the forward end of the select valve body 22 the select rod 23 is installed, extending into the reservoir chamber 20 through the hole 17, and at the forward end of this select rod 23 is provided a select piston 24. The reservoir chamber side of the select piston 24 has a fluid pressure receiving surface of the reservoir piston 25. In other words, the select piston 24 and the reservoir piston 25 are integrated each other. On the periphery surface is mounted the reservoir cup 26. The select piston 24 is being pressed, in the reservoir chamber 20, by the reservoir spring 27 toward the select valve chamber 16. In the normal state that the main fluid passage 10 is open, the force of the valve spring 21 is set higher than that of this reservoir spring 27, so that the reservoir chamber 20 is closed from the reservoir passage 15.

In the meantime, the forward end side of the select piston 24 forms a fluid pressure surface receiving the fluid pressure from the wheel cylinder 8. When the pressure from the wheel cylinder 8 is received, at the time of fluid pressure holding, the select piston 24 moves back toward the reservoir chamber 20, thus opening the select valve body 22 which is interlocked therewith.

In the following the operation of the present embodiment of the brake fluid pressure control apparatus will be explained.

First, when the main control device 28 detects the vehicle has stopped with the depression of the brake pedal, and then further detects the preset period of time (e.g. 1 to a few seconds) of this halt state has elapsed, the solenoid 4 is energized, closing the opening-closing port 6. Thus the main fluid passage 10 is closed to hold the fluid pressure in the wheel cylinders 8.

As the fluid pressure is held within the wheel cylinder 8, the pressure in the main fluid passage 10a on the master cylinder 7 side is decreased, and the pressure receiving surface of the select piston 24 is pressed by the fluid pressure from the wheel cylinder 8; accordingly the select piston 24 moves toward the reservoir chamber 20 against the force of the valve spring 21. The select valve body 22 interlocked with this is also moved away from the valve seat 18, thereby opening the hole 17 connected with the reservoir chamber 20 through the bypass fluid passage.

Next, when the reapplication of pressure from the master cylinder 7 is needed because of a lack of the pressure in the wheel cylinder, the master piston 34 in the master cylinder 7 begins moving toward compressing the master fluid pressure chamber 32 against the master spring 31.

At the initial stage of movement of the master piston 34 the master cup 33 fitted on the master piston 34 passes the relief port 30. At this time, the fluid pressure applied by the master piston 34 during the initial stage of movement thereof flows as the master cylinder 7→the main fluid passage 10a→the inlet port→the main valve chamber 13→the reservoir passage 15→the select chamber 16→the flow hole 17→the reservoir chamber 20, being received and consumed by a force for moving the reservoir piston 25, that is, the select piston 24, toward the wheel cylinder 8. Therefore, at the initial stage of movement of the master piston 34, the master cylinder pressure gradually increases, providing a good brake feel.

When pressure application to the master piston 34 is further continued, the reservoir piston 25 is moved toward the wheel cylinder 8, closing the hole 17 communicating with the reservoir chamber 20. At the same time, the pressure fluid in the main fluid passage 10 from the master cylinder 7 is supplied from the main valve chamber 13 to the main fluid passage 10b on the wheel cylinder 8 side via the booster cup 14, thus reapplying the pressure to the wheel cylinder 8.

Third Embodiment

Figure 5:
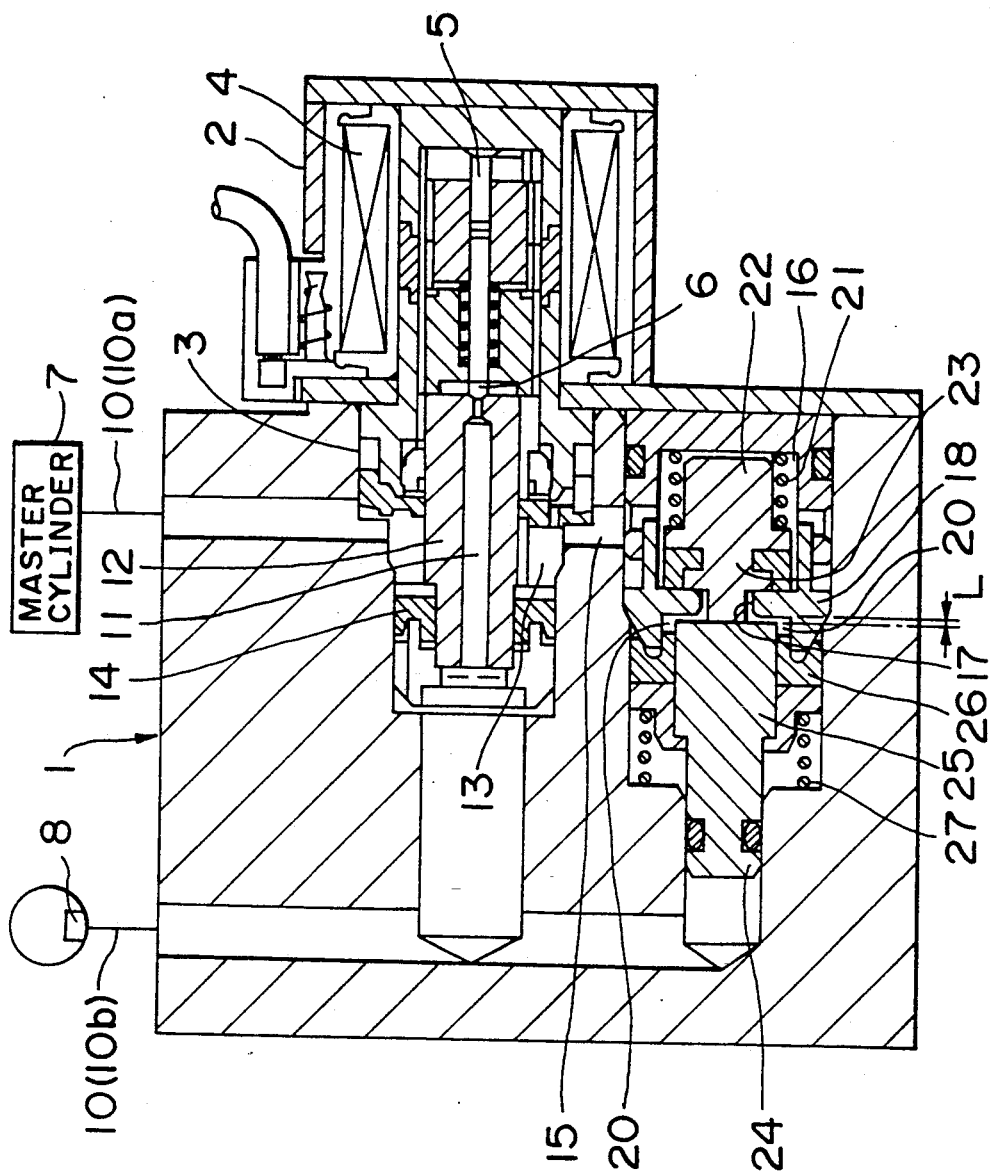
FIG. 5 is a sectional view showing a third embodiment of the brake fluid pressure control apparatus.

FIG. 5 shows an embodiment 3 of the brake fluid pressure control apparatus according to the present invention.

The present embodiment is approximate in construction to the embodiment 2 with the fluid receiving surface of the reservoir piston 25 located close to the valve seat 18, the valve seat 18 being held between this fluid receiving surface and the forward end surface of the select piston 24. The length of movement L of the select piston 24 can be held to a minimum by the distance between these two surfaces.

According to the present embodiment, when the opening-closing port 6 is closed to hold the fluid pressure in the wheel cylinder 8, the select piston 24 which is moved by the held pressure moves for an extremely short length (L), and accordingly the held pressure is not uselessly consumed.

Other constitutions in the same drawing will not be described because they are similar to that shown in FIG. 4 explained in the embodiment 2.

Embodiment 4

Figure 6:
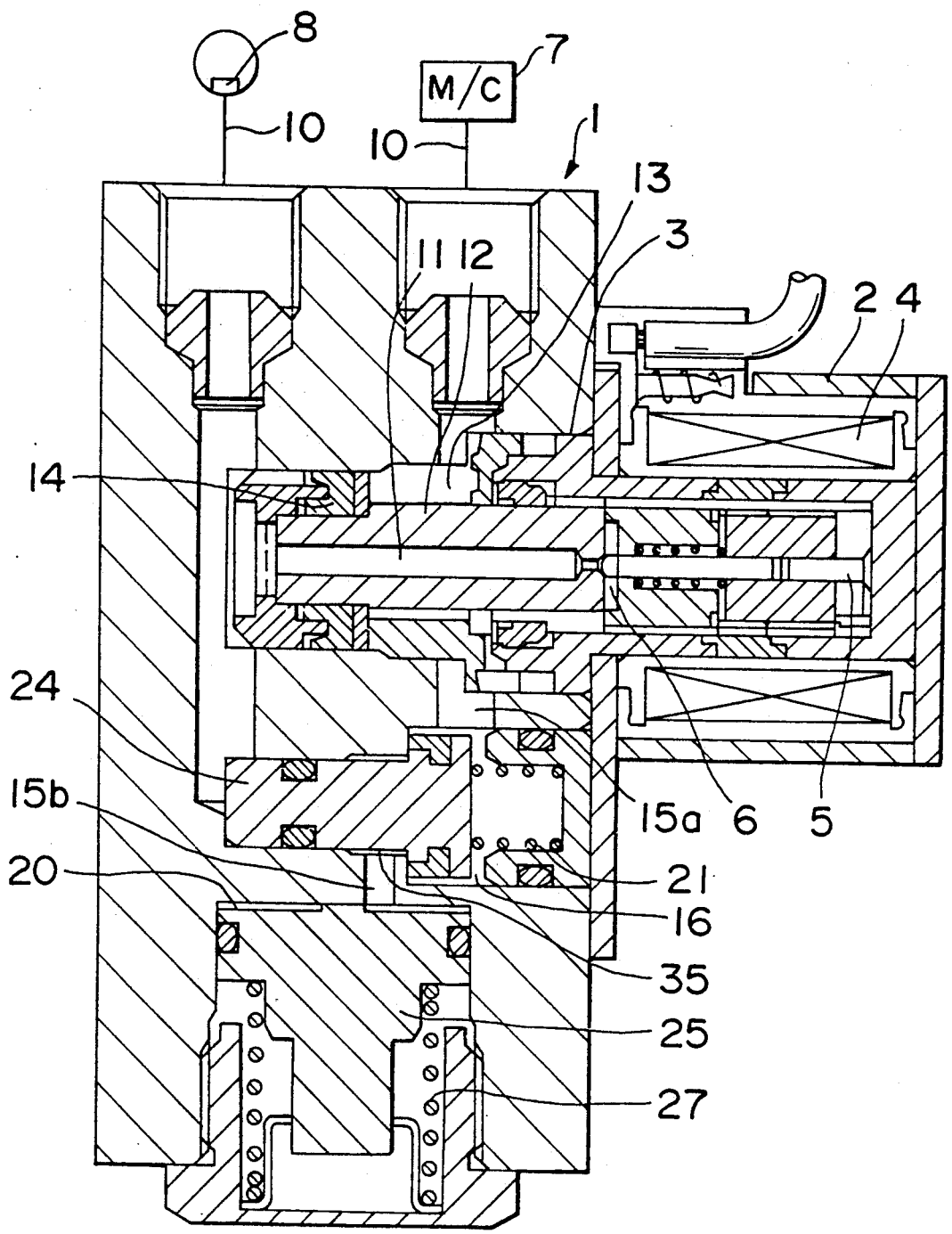
FIG. 6 is a sectional view showing a forth embodiment of the brake fluid pressure control apparatus.
Figure 7:
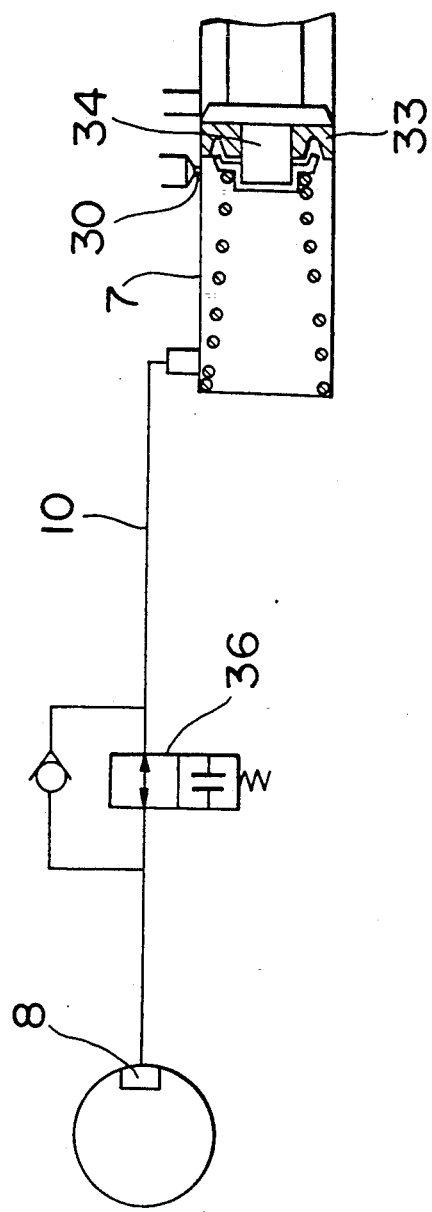
FIG. 7 is a schematic view showing a prior-art brake pressure holding device.

FIG. 6 shows the embodiment 4 of the brake fluid pressure control apparatus according to the present invention.

According to the present embodiment, the select piston 24 and the reservoir piston 25 are separately mounted.

That is, in the present embodiment 4, a first reservoir passage 15a from the main valve chamber 13 is connected to the select valve chamber 16. This select valve chamber 16 and the reservoir chamber 20 are connected by a second reservoir passage 15b. A passage 35 between the select valve chamber 16 and the second reservoir passage 15b is designed to be opened and closed by the movement of the select valve body 22. This passage 35 is kept closed by the force of the valve spring 21 while the main fluid passage 10 is open.

In the reservoir chamber 20 is installed the reservoir piston 25 to which the force of the reservoir spring 27 is being applied, for receiving and consuming the pressure during the initial period of movement of the master piston 34 at the time of the reapplication of the fluid pressure from the master cylinder 7 through the second bypass passage 15b.

According to the present embodiment, the adoption of the independent piston construction that the select piston 24 and the reservoir piston 25 are separately mounted can provide the reservoir piston 25 with a great capacity for pressure consumption.

As is obvious from the description given above, in the brake fluid pressure control apparatus according to the present invention in which the brake fluid pressure is held in the wheel cylinders while the motor vehicle is at a stop state, the fluid pressure during the intial stage of pressure reapplication is once received into the reservoir chamber, and therefore the master cylinder pressure gradually increases, thus giving the driver a good brake feel.

While only certain embodiments of the present invention have been described, it will be apparent to those skilled in the art that various changes and modifications may be made therein without departing from the spirit and scope of the present invention as claimed.

What is claimed is:

1. A brake fluid pressure control apparatus, comprising:
    a valve mechanism inserted in a main fluid passage connecting a master cylinder to a wheel cylinder, the valve mechanism having a main control valve for closing the main fluid passage so as to hold a wheel cylinder fluid pressure when a motor vehicle is halted and held stationary with brakes applied;
    a check valve mounted in the valve mechanism and permitting supply of a fluid pressure from the master cylinder to the wheel cylinder when said main fluid passage is closed by the main control valve;
    a stepped cylinder having an inlet port connected to the master cylinder and an outlet port connected to the wheel cylinder and;
    a stepped piston housed in the stepped cylinder, having a large diameter end receiving the fluid pressure of the master cylinder and a small diameter end receiving the wheel cylinder fluid pressure, and pressed toward the outlet port side by an elastic member;
    wherein, the stepped piston receives the fluid pressure of the master cylinder by movement of the stepped piston by utilizing a pressure difference between fluid the pressure supplied from said master cylinder to the large diameter end of the stepped piston and the wheel cylinder fluid pressure to the small diameter end of the stepped piston, when the fluid pressure is applied from the master cylinder to said wheel cylinder after said fluid passage is closed by said main control valve with the motor vehicle brought to a halt.

2. A brake fluid pressure control apparatus according to claim 1; wherein,
    said stepped piston has a cylindrical shape, and
    said main control valve and the check valve are housed in the stepped piston.

3. A brake fluid pressure control apparatus according to claim 1; wherein,
    said main control valve pressed toward inlet port side by the elastic member for opening the main fluid passage.

4. A brake fluid pressure control apparatus according to claim 1; wherein said main control valve including:
    a cylindrical valve seat having an opening-closing port,
    a ball valve for closing the opening-closing port, and
    a valve rod for pushing the ball valve to close the opening-closing port.

5. A brake fluid pressure control apparatus arranged between a master cylinder and a wheel cylinder of a motor vehicle, comprising:
    a housing having an inlet connected to said master cylinder and an outlet connected to said wheel cylinder;
    a piston arranged in the housing, said piston having a large diameter end for receiving an inlet fluid pressure from said master cylinder and a small diameter end for receiving an outlet fluid pressure from said wheel cylinder;
    a main control valve for opening and closing of a fluid passage from said inlet to said outlet through said piston, said main control valve closing said fluid passage when a brake pedal of said motor vehicle is activated so that the outlet fluid pressure to said wheel cylinder is maintained;
    a check valve provided in said piston to form a one way fluid passage from said inlet to said outlet when said piston is displaced by the fluid pressure from said master cylinder when said fluid pass is closed;
    wherein said piston is displaced by said inlet fluid pressure toward said outlet by overcoming said outlet fluid pressure when said fluid pass is closed, said inlet fluid pressure required for overcoming the outlet fluid pressure corresponds to a difference of surface area between said small diameter end and said large diameter end of said piston.

6. A brake fluid pressure control apparatus according to claim 5, wherein said main control valve is activated by a solenoid when said motor vehicle is halted by the movement of said brake pedal.

* * * * *